United States Patent
Ajiki et al.

(10) Patent No.: US 10,413,042 B2
(45) Date of Patent: Sep. 17, 2019

(54) MAKEUP SUPPORT DEVICE, MAKEUP SUPPORT METHOD, AND MAKEUP SUPPORT PROGRAM

(71) Applicant: PANASONIC INTELLECTUAL PROPERTY MANAGEMENT CO., LTD., Osaka (JP)

(72) Inventors: Kaori Ajiki, Osaka (JP); Rieko Asai, Osaka (JP); Yasushi Yamaguchi, Osaka (JP); Tomofumi Yamanashi, Kanagawa (JP); Aoi Muta, Osaka (JP); Chie Nishi, Kanagawa (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/252,134

(22) Filed: Jan. 18, 2019

(65) Prior Publication Data
US 2019/0150595 A1     May 23, 2019

Related U.S. Application Data

(63) Continuation of application No. 14/773,476, filed as application No. PCT/JP2014/000584 on Feb. 4, 2014.

(30) Foreign Application Priority Data

Mar. 22, 2013   (JP) ................................. 2013-059801

(51) Int. Cl.
*A45D 40/30* (2006.01)
*A45D 44/00* (2006.01)

(52) U.S. Cl.
CPC ........... *A45D 40/30* (2013.01); *A45D 44/005* (2013.01); *A45D 2044/007* (2013.01)

(58) Field of Classification Search
None
See application file for complete search history.

(56) References Cited

U.S. PATENT DOCUMENTS

| 4,554,635 A | 11/1985 | Levine |
|---|---|---|
| 8,425,477 B2 | 4/2013 | Mou et al. |

(Continued)

FOREIGN PATENT DOCUMENTS

| EP | 1975870 A | 10/2008 |
|---|---|---|
| JP | 11-169231 A | 6/1999 |

(Continued)

OTHER PUBLICATIONS

International Search Report in PCT/JP2014/000584, dated Apr. 1, 2014.

(Continued)

*Primary Examiner* — Michelle Chin
(74) *Attorney, Agent, or Firm* — Greenblum & Bernstein, P.L.C.

(57) ABSTRACT

A skin-attachment sheet for makeup includes a thin-film layer made of polylactic acid, polyglycolic acid, polycaprolactone, or a copolymer thereof, and a biocompatible polymer. The thickness of a first layer thereof is from 10 nm to 500 nm. An ink corresponding to a makeup image is printed on a surface of the thin-film layer on an opposite side of a surface of the thin-film layer attachable to the skin. The sheet also includes a mount that is provided on a surface on the thin-film layer, and that is capable of being peeled off from the surface on which the mount is provided.

13 Claims, 12 Drawing Sheets

(56) References Cited

U.S. PATENT DOCUMENTS

| | | | |
|---|---|---|---|
| 8,464,732 B2 | 6/2013 | Wong | |
| 8,746,820 B2 | 6/2014 | Murata | |
| 2009/0246235 A1* | 10/2009 | Asano | A61K 8/88 424/401 |
| 2010/0068247 A1* | 3/2010 | Mou | A45D 44/002 424/443 |
| 2010/0226531 A1 | 9/2010 | Goto | |
| 2012/0067364 A1* | 3/2012 | Wong | A45D 44/005 132/200 |
| 2012/0113171 A1 | 5/2012 | Murata | |
| 2012/0223956 A1 | 9/2012 | Saito et al. | |
| 2012/0325141 A1 | 12/2012 | Mohammadi et al. | |
| 2015/0049111 A1 | 2/2015 | Yamanashi et al. | |
| 2015/0050624 A1 | 2/2015 | Yamanashi et al. | |
| 2015/0086945 A1 | 3/2015 | Yamanashi et al. | |
| 2015/0118655 A1 | 4/2015 | Yamanashi et al. | |
| 2015/0209243 A1* | 7/2015 | Shiroya | A61K 8/676 424/401 |
| 2015/0248581 A1 | 9/2015 | Gouda et al. | |
| 2015/0254500 A1 | 9/2015 | Izumi et al. | |
| 2015/0254501 A1 | 9/2015 | Yamanashi et al. | |
| 2015/0262403 A1 | 9/2015 | Yamanashi | |
| 2015/0366328 A1 | 12/2015 | Tamura et al. | |
| 2016/0000209 A1 | 1/2016 | Yamanashi et al. | |
| 2016/0015152 A1 | 1/2016 | Ajiki et al. | |

FOREIGN PATENT DOCUMENTS

| | | |
|---|---|---|
| JP | 2001-346627 A | 12/2001 |
| JP | 2003-044837 A | 2/2003 |
| JP | 2004-034304 A | 2/2004 |
| JP | 2007-175384 A | 7/2007 |
| JP | 2012-502908 A | 2/2012 |
| JP | 2012-071126 A | 4/2012 |
| JP | 2012-086475 A | 5/2012 |
| JP | 2012-135587 A | 7/2012 |
| JP | 2012-203425 A | 10/2012 |
| JP | 2013-039832 A | 2/2013 |

OTHER PUBLICATIONS

European Search Report in European Patent Application No. 14767708.2, dated Mar. 8, 2016.

\* cited by examiner

410

| GROUP OF FACIAL FEATURE VALUES | MAKEUP ID |
|---|---|
| FG1 | FM1、FM2 |
| FG2 | FM2、FM3 |
| FG3 | FM4、FM5 |
| ⋮ | ⋮ |

| | 421 | 422 | 423 | 424 | 425 |
|---|---|---|---|---|---|
| | MAKEUP ID | MAKEUP TYPE | COLOR | CONCENTRATION | RANGE |
| | FM1 | T1 | C1 | D1 | A1 |
| | FM1 | T2 | C2 | D2 | A2 |
| | FM1 | T3 | C3 | D3 | A3 |
| | ⋮ | ⋮ | ⋮ | ⋮ | ⋮ |

*FIG. 4*

| FACIAL PART ID | REGION | PERSON ID |
|---|---|---|
| P1 | R1 | H1 |
| P2 | R2 | H1 |
| ⋮ | ⋮ | ⋮ |

MAKEUP SUPPORT DEVICE, MAKEUP SUPPORT METHOD, AND MAKEUP SUPPORT PROGRAM

CROSS-REFERENCE TO RELATED APPLICATIONS

This application is a continuation of U.S. application Ser. No. 14/773,476, filed Sep. 8, 2015, pending, which is a § 371 national stage entry of International Patent Application No. PCT/JP20140A00584, filed Feb. 4, 2014, which claims the foreign priority benefit of Japanese Patent Application No. 2013-059801, filed Mar. 22, 2013. The entire disclosure of each of the above-identified applications, including the specification, drawings, and claims, is incorporated herein by reference in its entirety.

TECHNICAL FIELD

The present invention relates to a makeup assisting apparatus, a makeup assisting method and a makeup assisting program for assisting facial makeup (cosmetic makeup).

BACKGROUND ART

In recent years, the way of applying makeup to the face (hereinafter, simply referred to as "makeup") has been diversified. Therefore, it has become difficult, particularly for a person who has no sufficient knowledge about makeup to select appropriate makeup from an infinite number of options because it takes an enormous amount of time and effort to actually try, judge and compare various types of makeup.

Under such circumstances, PTL 1 and PTL 2 disclose techniques in which makeup that matches the feature of the face is selected, and a simulation image of the face on which the selected makeup is applied is created and presented, for example. In the techniques disclosed in PTL 1 and PTL 2, a captured image of a face (hereinafter, simply referred to as "face") that is subjected to makeup is acquired, the feature of the face is extracted, and makeup that matches the feature of the face is selected based on a selection criteria set in advance. Then, in the related art, on the acquired image, an image indicating a state of makeup obtained by applying the selected makeup to the face is superimposed to create and display a simulation image.

According to the above-mentioned techniques, it is possible to narrow down targets of simulation image creation as makeup that matches the feature of the face and judge whether the makeup is good or bad without actually performing makeup. That is, it is possible to select appropriate makeup with a less amount of time and effort.

However, for a user who has not enough makeup application skill, it is difficult to reproduce the makeup even when a makeup simulation image is presented. Thus, the technique relating to basic cosmetics described in PTL 3 may be diverted to makeup.

According to the technique described in PTL 3, basic cosmetic materials corresponding to skin care selected for each face are printed on a cosmetic delivery sheet whose base material is a felt, paper or water-soluble material or the like. The user attaches such a cosmetic delivery sheet to the skin of the face with the printed surface being oriented toward the face, and can thereby hold the basic cosmetic materials applied to the face. Instead of these basic cosmetic materials, general cosmetic materials corresponding to the selected makeup may be printed.

CITATION LIST

Patent Literature

PTL 1
Japanese Patent Application Laid-Open No. 2001-346627
PTL 2
Japanese Patent Application Laid-Open No. 2007-175384
PTL 3
Japanese Unexamined Patent Application Publication (Translation of PCT Application) No. 2012-502908
PTL 4
Japanese Patent Application Laid-Open No. 2003-44837
PTL 5
Japanese Patent Application Laid-Open No. 2012-86475
PTL 6
Japanese Patent Application Laid-Open No. 2013-39832
PTL 7
Japanese Patent Application Laid-Open No. 2012-203425

SUMMARY OF INVENTION

Technical Problem

However, even when the technique described in PTL 3 is used, it is difficult to sufficiently reproduce the selected makeup. This is because successfully transferring the general cosmetic materials from the cosmetic delivery sheet requires a certain degree of skill. When the cosmetic delivery sheet is left attached as a water-soluble substance, dissolution of the cosmetic delivery sheet may cause concentration or distribution of the general cosmetic materials to change, resulting in a smeared makeup. Therefore, the related art has a problem that it is difficult to appropriately assist makeup for users who do not have enough makeup skill.

An object of the present invention is to provide a makeup assisting apparatus, a makeup assisting method, and a makeup assisting program capable of appropriately assisting users who do not have enough makeup skill to perform makeup.

Solution to Problem

A makeup assisting apparatus according to an aspect of the present invention includes: a makeup selecting section that selects makeup for each face, the makeup being a way of applying makeup, the face being subjected to the makeup; and a makeup presenting section that causes pigment corresponding to the selected makeup to be held on a surface on a side of a sheet closely attachable to a skin of the face for a long time, the side being opposite to a side of the sheet where the sheet is to be closely attached to the skin.

A makeup assisting method according to an aspect of the present invention includes: selecting makeup for each face, the makeup being a way of applying makeup, the face being subjected to the makeup; and causing pigment corresponding to the selected makeup to be held on a surface on a side of a sheet closely attachable to a skin of the face for a long time, the side being opposite to a side of the sheet where the sheet is to be closely attached to the skin.

A makeup assisting program according to an aspect of the present invention is a program that causes a computer to execute processing including: selecting makeup for each face, the makeup being a way of applying makeup, the face being subjected to the makeup; and causing pigment corresponding to the selected makeup to be held on a surface on a side of a sheet closely attachable to a skin of the face for a long time, the side being opposite to a side of the sheet where the sheet is to be closely attachable to the skin.

Advantageous Effects of Invention

According to the present invention, it is possible to appropriately assist users who do not have enough makeup skill to perform makeup.

BRIEF DESCRIPTION OF DRAWINGS

FIG. 3 is a diagram illustrating an exemplary makeup table according to Embodiment 2;

FIG. 4 is a diagram illustrating an exemplary makeup information table according to Embodiment 2;

FIG. 9 is a diagram illustrating exemplary facial part information according to Embodiment 2;

DESCRIPTION OF EMBODIMENTS

In the following, embodiments of the present invention will be described in detail with reference to the accompanying drawings.

Embodiment 1

Embodiment 1 of the present invention is an example of a basic mode of the present invention.

Figure 1:
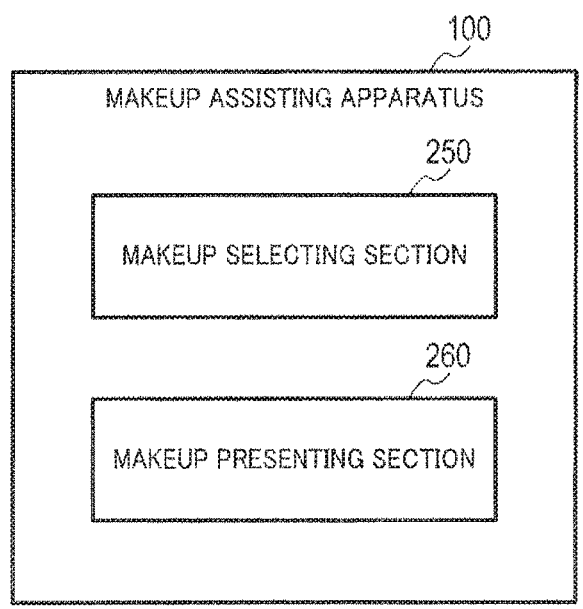
FIG. 1 is a block diagram illustrating an exemplary configuration of a makeup assisting apparatus according to Embodiment 1 of the present invention.

FIG. 1 is a block diagram illustrating an exemplary configuration of a makeup assisting apparatus according to the present embodiment.

In FIG. 1, makeup assisting apparatus 100 is provided with makeup selecting section 250 and makeup presenting section 260.

Makeup selecting section 250 selects makeup which is the way of applying makeup for each face (hereinafter simply referred to as "face") that is subjected to makeup.

Makeup presenting section 260 causes pigment corresponding to the selected makeup to be held on the surface on a side of a sheet closely attachable to the skin of the face for a long time, the side being opposite to the side closely attached to the skin.

Makeup assisting apparatus 100 has, for example, a central processing unit (CPU), a storage medium such as a read-only memory (ROM) having a control program stored therein, and a working memory such as a random access memory (RAM), although these components are not illustrated. In this case, the above-described functions of the sections are implemented by the CPU executing the control program.

Such makeup assisting apparatus 100 can cause pigment corresponding to the makeup selected for each face to be held on the surface of a side of the sheet closely attachable to the skin of the face for a long time, the side being opposite to the side closely attachable to the skin. This allows the user to attach the sheet to which the selected makeup is applied to the skin of the face, leave the sheet attached, and thereby easily reproduce such makeup. Therefore, makeup assisting apparatus 100 can appropriately assist a user who does not have enough makeup skill to perform makeup.

Embodiment 2

Embodiment 2 of the present invention is an example of a specific mode of the present invention. Embodiment 2 is an exemplary case where the present invention is applied in an apparatus having a display provided with a touch panel and a digital camera.

<Explanation of Terms>

First, the terms used in the present embodiment are explained.

A "facial part" refers to a part characterizing impression of the face, such as eyes, eyebrows, nose, cheekbones, lips and an outline.

"Facial part ID" refers to identification information of the facial part.

A "region of the facial part" refers to a region occupied by the facial part on an image or in real space, and includes a position of a feature point of the facial part, such as corners of the eyes.

A "facial feature value" refers to a value of a predetermined parameter which indicates features of the face. Here, the facial feature value is multivariate data including a plurality of values such as a ratio of a length of the face with respect to a width of the face, a ratio of a length of the nose with respect to a distance between both eyes and a ratio of a width of the eye with respect to the width of the face.

"Makeup" refers to the way (type) of applying makeup such as eye shadows and lipsticks that corrects impression of features of the facial part to improve aesthetics, and includes at least a color, application concentration and application range of pigment.

"Makeup information" refers to information representing makeup contents.

"Makeup type" refers to the type of makeup such as "foundation," "eye shadow," "lipstick," and "blush" that are identified by at least the positional relationship with facial parts.

"Makeup ID" refers to identification information of makeup.

<Configuration of Makeup Assisting Apparatus>

Next, a configuration of the makeup assisting apparatus according to the present embodiment is described.

Figure 2:
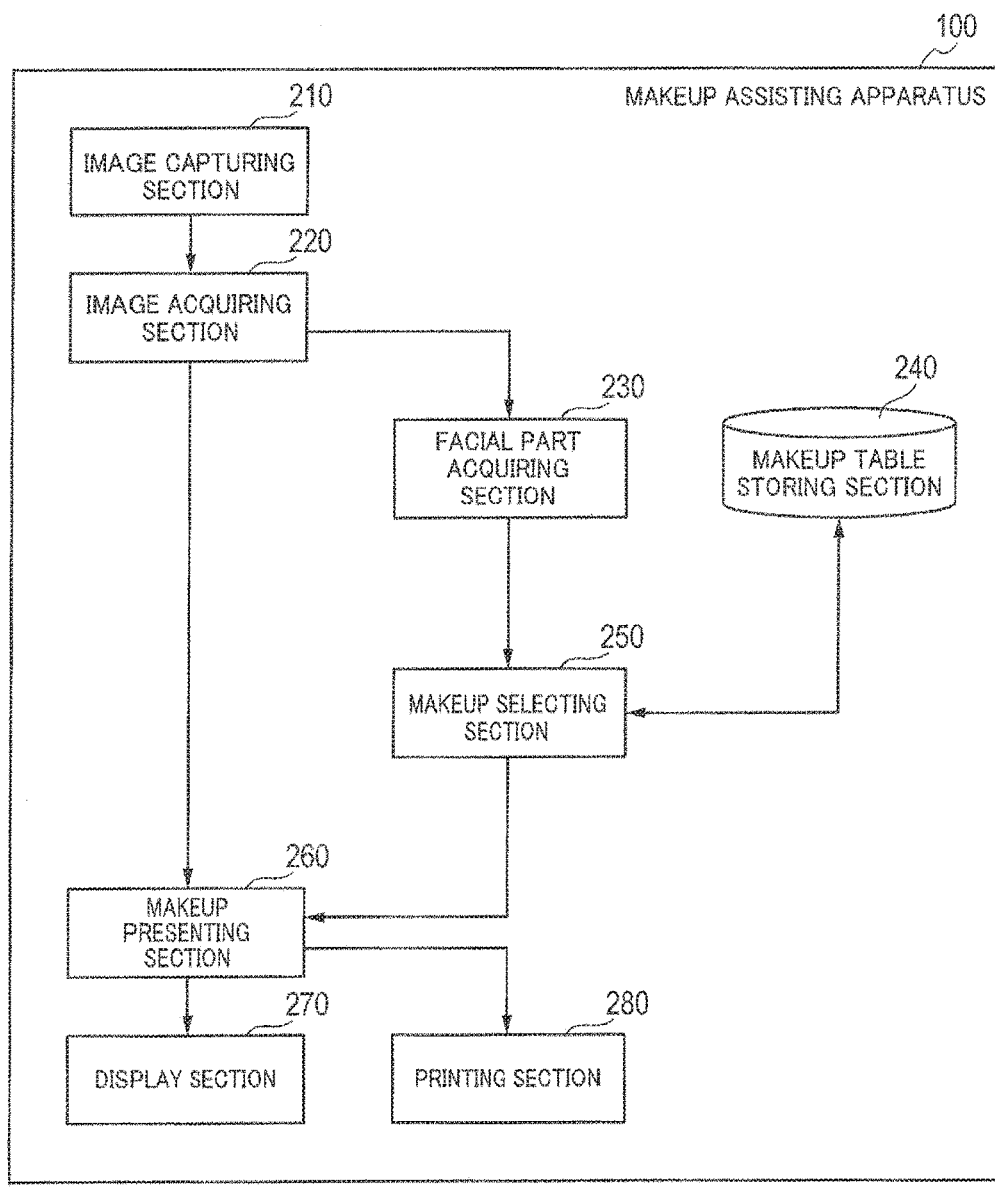
FIG. 2 is a block diagram illustrating an exemplary configuration of a makeup assisting apparatus according to Embodiment 2 of the present invention.

FIG. 2 is a block diagram illustrating an exemplary configuration of the makeup assisting apparatus according to the present embodiment.

In FIG. 2, makeup assisting apparatus 100 includes image capturing section 210, image acquiring section 220, facial part acquiring section 230, makeup table storing section 240, makeup selecting section 250, makeup presenting section 260, display section 270 and printing section 280.

Image capturing section 210 is, for example, a digital video camera, and captures a moving image of the face. Capturing section 210 outputs the captured moving image to image acquiring section 220. The moving image includes a plurality of time-series images (frame images). Note that in the present embodiment, the face subjected to makeup is the face of the user of makeup assisting apparatus 100.

Image acquiring section 220 sequentially acquires images making up the moving image from the inputted moving image. Image acquiring section 220 outputs the acquired image to facial part acquiring section 230 and makeup presenting section 260.

Facial part acquiring section 230 acquires a region of the facial part from the inputted image. The region of the facial part is acquired, for example, through matching between each partial region of the image and a template image of each facial part prepared in advance (for example, see PTL 4). Facial part acquiring section 230 outputs identification information of the acquired facial part and information indicating the region (hereinafter, referred to as "facial part information") to makeup selecting section 250.

Makeup table storing section 240 stores a makeup table. The makeup table is a table describing, in association with a facial feature value acquired, makeup appropriate for the face having the facial feature value.

It is assumed in the present embodiment that principal component analysis is performed in advance on samples of the facial feature value of an unspecified number of faces to which makeup experts have applied makeup in the past. It is assumed that the results of the principal component analysis are grouped in advance using a publicly known principal component grouping method in which it is determined based on a determination criterion such as whether or not a principal component value is 1 σ or higher. Further, it is assumed that in the makeup table, makeup which has been frequently applied in the past to the face belonging to the group is registered for each facial feature value group.

FIG. 3 is a diagram illustrating an exemplary makeup table.

As shown in FIG. 3, makeup table 410 describes a plurality of makeup IDs 412 for each facial feature value group 411. For example, two makeup IDs 412 of "FM1 and FM2" are associated with facial feature value group 411 of "FG1." This indicates that when the facial feature value of the user's face is FG1, the makeup indicated by the makeup ID of "FM1" and the makeup indicated by the makeup ID of "FM2" are appropriate.

Note that the trends of makeup change frequently and makeup to be presented should be changed frequently. For this reason, it is desirable to periodically update makeup table 410 from a server on the Internet via, for example, a communication circuit (not shown) provided at makeup assisting apparatus 100.

Makeup table storing section 240 in FIG. 2 stores a makeup information table. The makeup information table is a table describing makeup information of the makeup indicated by makeup ID 412 described in makeup table 410 (see FIG. 3).

Figure 4:
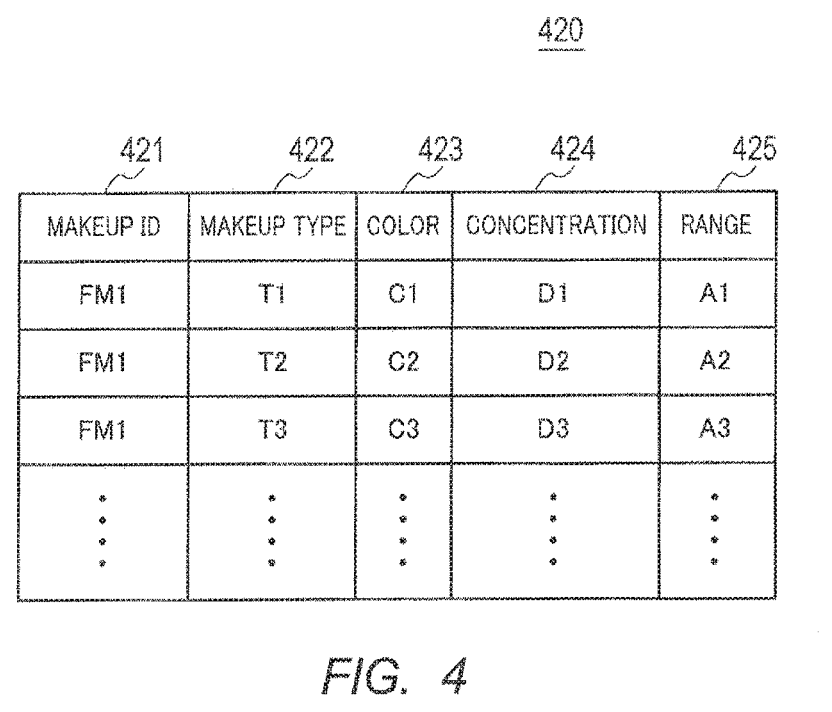

FIG. 4 is a diagram illustrating an exemplary makeup information table stored in makeup table storing section 240.

As shown in FIG. 4, makeup information table 420 describes makeup ID 421, makeup type 422, color 423, concentration 424 and range 425 in association with one another.

Makeup ID 421 is associated with makeup ID 412 (see FIG. 3) of makeup table 410. Makeup type 422, which is illustrated in a simplified form, more specifically includes "foundation," "eye shadow," "lipstick" and "blush" or the like. Color 423, which is illustrated in a simplified form, more specifically includes an RGB value and a gloss value or the like. Concentration 424, which is illustrated in a simplified form, more specifically includes a level of transparency when an image is superimposed on the image of the face and the way of applying gradation or the like. Range 425, which is illustrated in a simplified form, more specifically includes a set of a relative coordinate group from a feature point, a relative position of a central point with respect to the feature point and a radius, or the like.

A set of color 423, concentration 424 and range 425 includes at least information necessary for imaging. That is, in the present embodiment, suppose the makeup information includes at least information necessary to generate an image when makeup is applied to the face (information indicating the difference in face color).

Note that makeup table 410 shown in FIG. 3 and makeup information table 420 shown in FIG. 4 may be integrated into one table.

Makeup selecting section 250 in FIG. 2 acquires a facial feature value. Note that makeup selecting section 250 may acquire a facial feature value from facial part information inputted from facial part acquiring section 230 or acquire a facial feature value from an image by analyzing the image acquired by image acquiring section 220. Makeup selecting section 250 selects a makeup candidate which is a candidate for makeup subjected to printing which will be described later for each facial part with reference to makeup table 410 (see FIG. 3) based on the acquired facial feature value. Makeup selecting section 250 acquires makeup information of the selected makeup candidate from makeup information table 420 (see FIG. 4) and outputs the makeup information to makeup presenting section 260.

Note that as described above, makeup table 410 registers makeup ID 412 for each facial feature value group. Therefore, makeup selecting section 250 determines to which of facial feature value groups 411 registered in makeup table 410 the facial feature value acquired from the face belongs and selects makeup ID 412 associated with determined facial feature value group 411. This determination is made, for example, by calculating a distance between the acquired facial feature value and a representative value (centroid) of each group.

Makeup selecting section 250 receives from the user, an operation of switching between makeup candidates (hereinafter referred to as "display makeup") to be a display target of a simulation image, which will be described later, and an operation of selecting display makeup. These operations are performed via, for example, a touch panel provided in display section 270, which will be described later. Makeup selecting section 250 selects the selected display makeup as the application makeup which is makeup subjected to printing, which will be described later. Makeup selecting section 250 acquires makeup information of the selected application makeup from makeup information table 420 (see FIG. 4) and outputs the makeup information to makeup presenting section 260.

Makeup presenting section 260 causes display section 270, which will be described later, to display a simulation image of the makeup candidate. More specifically, makeup presenting section 260 superimposes an image illustrating a condition of the makeup candidate when the makeup candidate is applied to the face on the image inputted from image acquiring section 220 and generates a simulation image. The superimposing position of the image of the makeup candidate is calculated from, for example, facial part information and a range of makeup included in the makeup information. Makeup presenting section 260 then outputs the image data of the generated simulation image to display section 270.

It should be noted that the image in the simulation image is superimposed by, for example, a publicly-known image combining process such as an alpha ($\alpha$) blending process. In this case, an alpha value ($\alpha$) is set according to concentration of makeup. The alpha blending process is expressed with, for example, the following Equations 1 to 3:

$$R = r_2 \times \alpha + r_1 \times (1-\alpha) \tag{1}$$

$$G = g_2 \times \alpha + g_1 \times (1-\alpha) \tag{2}$$

$$B = b_2 \times \alpha + b_1 \times (1-\alpha) \tag{3}$$

where $r_1$, $g_1$ and $b_1$ are RGB values of an arbitrary region in the captured image, $r_2$, $g_2$ and $b_2$ are RGB values of the makeup, and R, G and B are RGB values of the corresponding region in the simulation image.

Further, it is assumed that an order of application when makeup is applied to the face in an overlapped manner (hereinafter, referred to as an "application order") is set for each makeup, and an image in a case where the makeup is applied is presented as an image shaded with density according to the concentration. The application order defines, for example, blush should be applied after foundation is applied. In this case, the images may be superimposed on the captured image by makeup presenting section 260 overpainting the image of each makeup in an order according to the application order.

Makeup presenting section 260 causes pigment corresponding to the selected application makeup to be held on the surface on a side of a predetermined sheet closely attachable to the skin of the face for a long time (hereinafter referred to as "skin-attachment sheet"), the side being opposite to the side closely attached to the skin.

More specifically, makeup presenting section 260 generates image data of an image illustrating the state of the application makeup when a makeup candidate is applied to the face and outputs the generated image data to printing section 280 which will be described later. Thus, makeup presenting section 260 causes printing section 280 to print the image corresponding to the application makeup on the surface of the skin-attachment sheet.

Note that when the application makeup is selected for a plurality of facial parts, makeup presenting section 260 causes printing section 280 to print the image corresponding to the application makeup on the surface of the skin-attachment sheet with an arrangement corresponding to the arrangement of the plurality of acquired regions for a plurality of facial parts.

Suppose makeup presenting section 260 calculates the shape of the skin-attachment sheet that can be three-dimensionally attached to the face, from the outline of the face, regions of both eyes, region of the nose or the like. Suppose makeup presenting section 260 also outputs the calculated shape of the skin-attachment sheet and information indicating a positional relationship between the shape and the image corresponding to the application makeup (hereinafter referred to as "sheet shape information") to printing section 280. Here, it is assumed that the sheet shape information includes at least information indicating the outline of the face, regions of both eyelids when both eyes are closed and region of the nose and information indicating a positional relationship between these regions and the application makeup. Note that the regions of both eyelids when both eyes are closed are preferably regions of the eyeholes, and are regions connecting the inner corners of the eyes, lower eyelid, outer corners of the eyes and under eyebrow, for example.

Display section 270 is, for example, a display part of a display with a touch panel. Display section 270 displays a simulation image based on image data of the inputted simulation image.

Printing section 280 performs multi-color printing on the surface of the skin-attachment sheet. More specifically, printing section 280 receives the supply of the skin-attachment sheet and the image data of the application makeup, and prints an image corresponding to the application makeup indicated by the image data on the surface on the side of the skin-attachment sheet opposite to the side closely attached to the skin (hereinafter referred to as "outside face"). Printing section 280 cuts the skin-attachment sheet on which the image corresponding to the application makeup is printed based on the inputted sheet shape information.

The skin-attachment sheet is a biocompatible sheet attached to the skin of the face without any uncomfortable feeling. More specifically, the skin-attachment sheet is a thin film having a thickness of 10 nm to 500 nm containing a layer made of polylactic acid, polyglycolic acid, polycaprolactone, or a copolymer thereof, and a biocompatible polymer such as hyaluronic acid, and chitosan, for example. Since the thin-film available as a skin-attachment sheet is described, for example, in PTL 5, detailed description thereof will be omitted here. Suppose the skin-attachment sheet has a structure in which a mount is attached to the surface closely attached to the skin (hereinafter referred to as "inside face") and a sheet protection film is attached to the outside face. Suppose the skin-attachment sheet is supplied to printing section 280 with the sheet protection film peeled off by the user.

Figure 5:
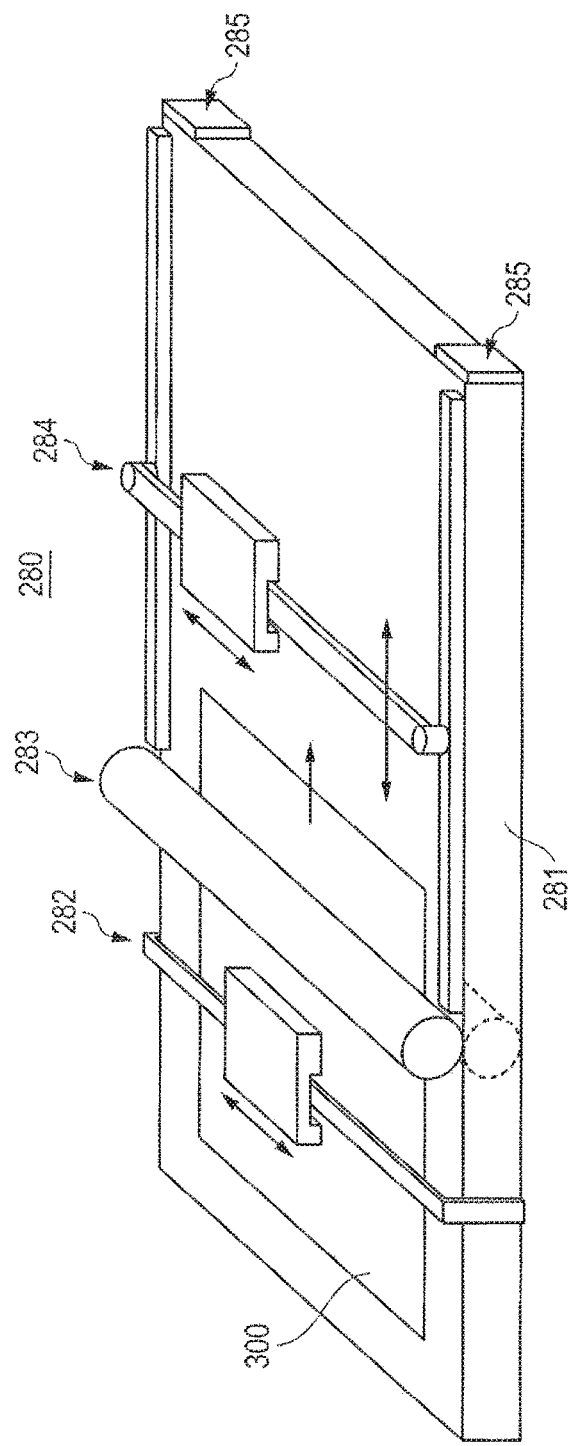
FIG. 5 is a perspective view illustrating an exemplary schematic configuration of a printing section according to Embodiment 2.

FIG. 5 is a perspective view illustrating an exemplary schematic configuration of printing section 280.

As shown in FIG. 5, printing section 280 is constructed of printing head section 282, roll feeding section 283, laser cutter section 284, and sheet hook sections 285, which are arranged in that order on base part 281 on which skin-attachment sheet 300 is placed.

Printing head section 282 prints an image corresponding to the application makeup based on image data. Roll feeding section 283 sends skin-attachment sheet 300 whose printing is completed to the laser cutter section 284 side. Sheet hook sections 285 regulate the movement of skin-attachment sheet 300 sent to the laser cutter section 284 side.

Laser cutter section 284 cuts skin-attachment sheet 300 using a laser cutter based on sheet shape information.

As a specific configuration of ink used in printing section 280 and each section, any publicly known technique can be adopted if it is appropriate to image printing of the skin-attachment sheet on the outside face (e.g., see PTL 6 and PTL 7). Note that since printing is performed on the outside face of skin-attachment sheet 300, the ink does not come into close contact with the skin. Therefore, the ink does not require high biocompatibility, and can be selected at a high degree of freedom.

Note that makeup assisting apparatus 100 in FIG. 2 has, for example, a central processing unit (CPU), a storage medium such as a read-only memory (ROM) having a control program stored therein, and a working memory such as a random access memory (RAM), although these components are not illustrated. In this case, the above-described functions of the sections are implemented by the CPU executing the control program.

Such makeup assisting apparatus 100 can cause pigment corresponding to makeup selected for each face to be held on the surface of the side of the sheet closely attachable to the skin of the face for a long time, the side being opposite to the side closely attached to the skin. The user attaches the sheet to which the selected makeup is applied to the skin of the face, leaves the sheet attached, and can thereby easily reproduce makeup.

<Operation of Makeup Assisting Apparatus>

Next, an operation of makeup assisting apparatus 100 is described.

Figure 6:
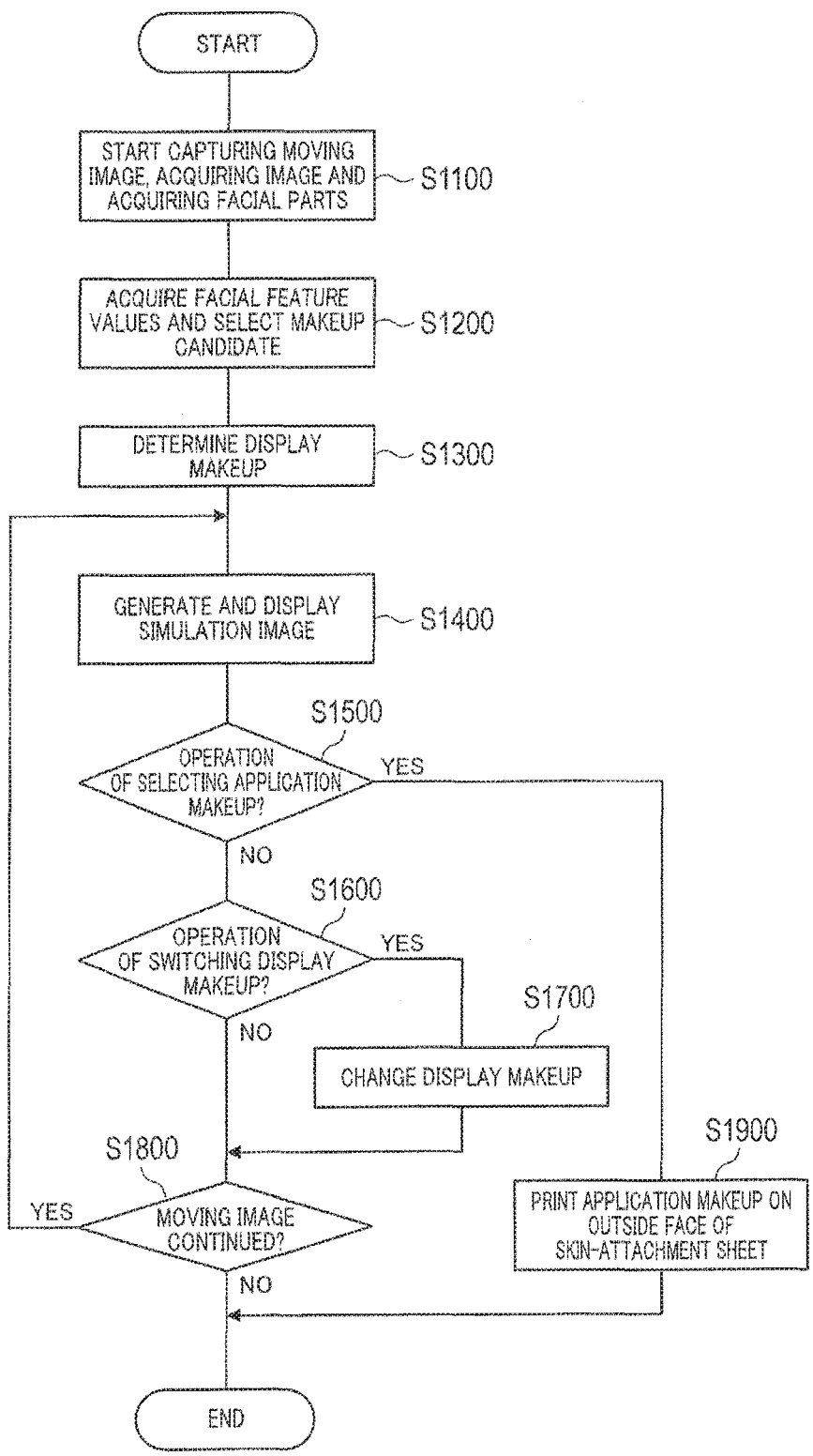
FIG. 6 is a flowchart illustrating an exemplary operation of the makeup assisting apparatus according to Embodiment 2.

FIG. 6 is a flowchart illustrating an exemplary operation of makeup assisting apparatus 100.

First, in step S1100, image capturing section 210 starts capturing a moving image of the user's face and image acquiring section 220 starts acquiring images that make up the captured moving image. Facial part acquiring section 230 starts acquiring facial parts of the face included in the image.

In this case, facial part acquiring section 230 extracts feature points of the face (facial parts) from the image by analyzing the image, for example. Facial part acquiring section 230 acquires a region formed of feature points that make up an identical facial part as a region of the facial part. Facial part acquiring section 230 generates facial part information from the region of the acquired facial part.

Figure 7:
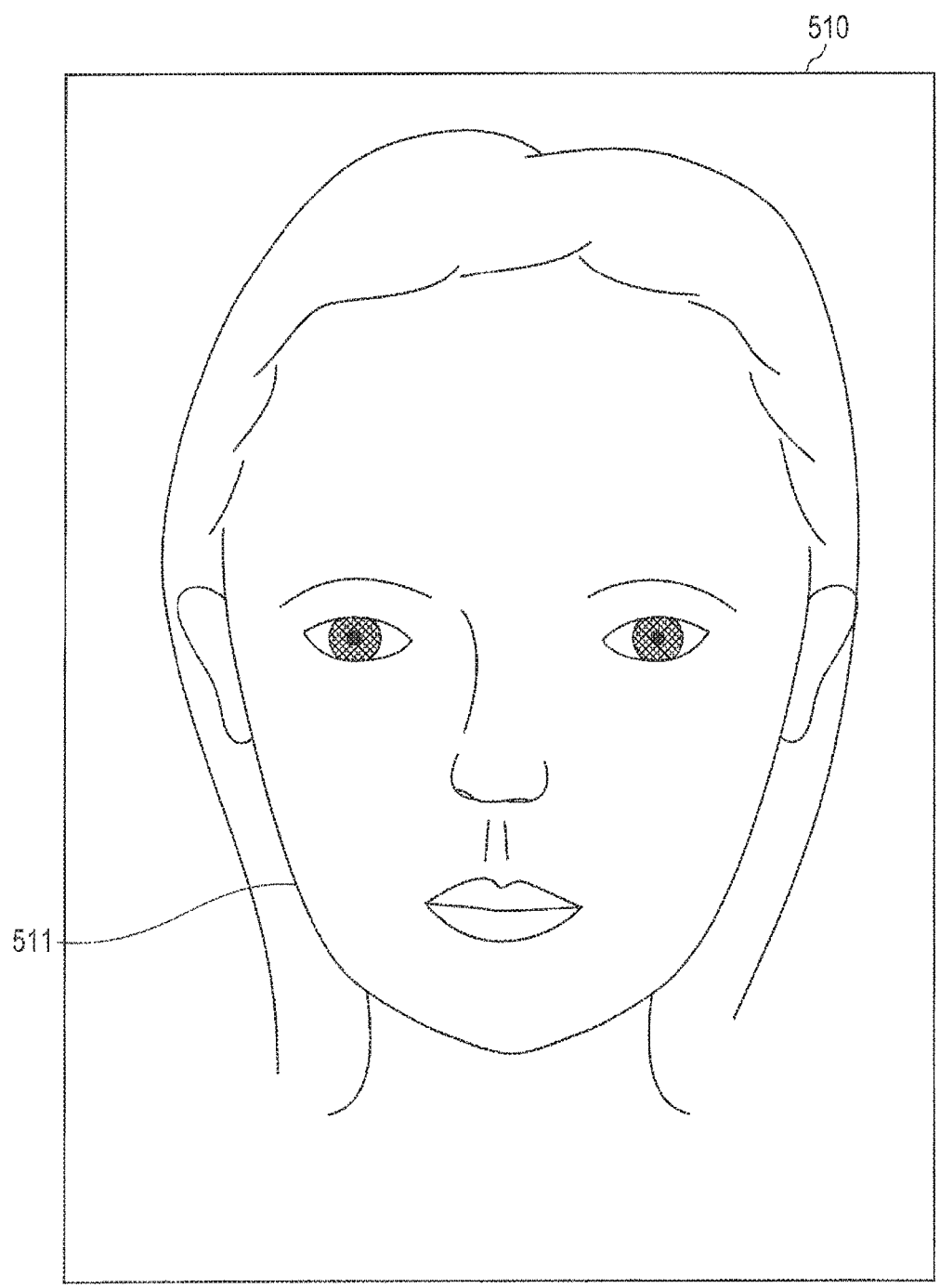
FIG. 7 is a diagram illustrating an exemplary image according to Embodiment 2.

FIG. 7 is a diagram illustrating an exemplary image acquired in step S1100 in FIG. 6.

As illustrated in FIG. 7, image 510 includes an image of the face of the user (hereinafter, referred to as a "face image") 511. Here, the user wears no makeup.

Figure 8:
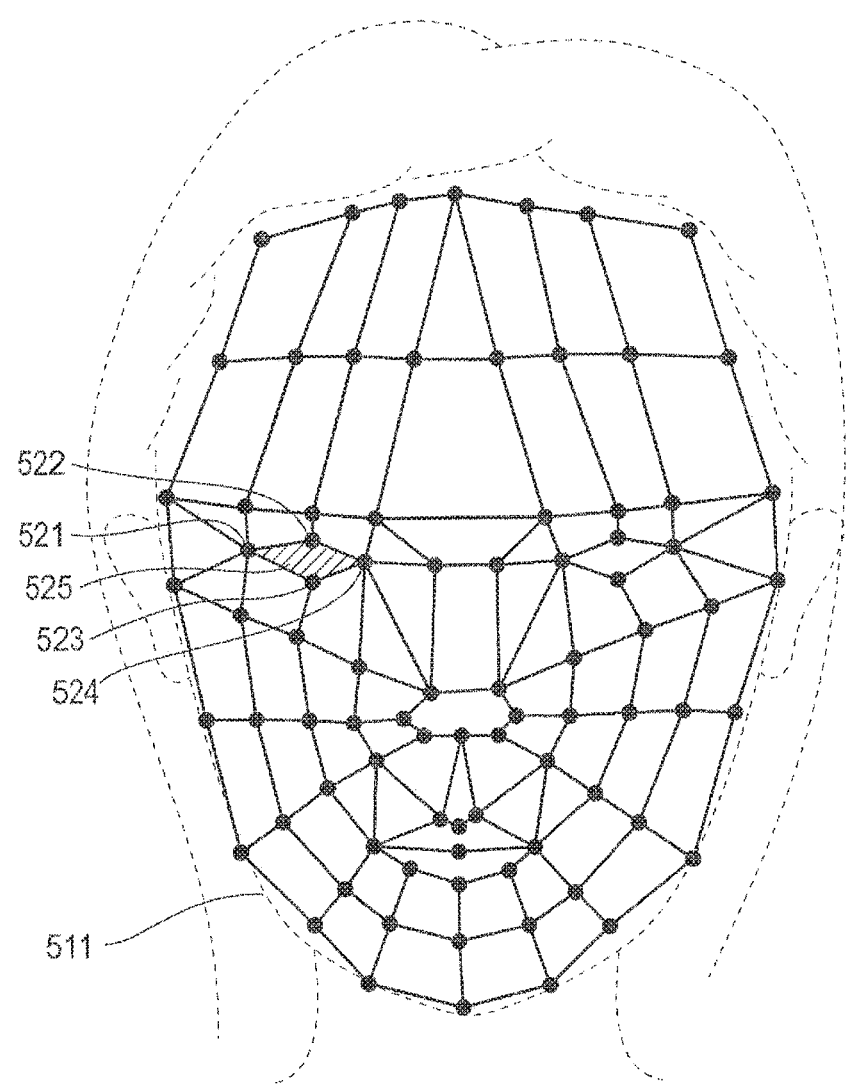
FIG. 8 is a diagram illustrating an exemplary arrangement of feature points of the face according to Embodiment 2.

FIG. 8 is a diagram illustrating an exemplary arrangement of feature points of the face extracted in step S1100 of FIG. 6.

As shown in FIG. 8, a plurality of feature points (shown by symbols "●") are extracted from face image 511. For example, first to fourth feature points 521 to 524 make up the right eye. Therefore, facial part acquiring section 230 acquires region 525 surrounded by first to fourth feature points 521 to 524 as the region of the right eye.

FIG. 9 is a diagram illustrating exemplary facial part information generated in step S1100 of FIG. 6.

As illustrated in FIG. 9, facial part information 530, for example, describes region 532 and person ID 533 for each facial part ID 531. Facial part ID 531 is identification information of the facial part such as the left eye and the upper lip. Region 532, which is information indicating a range of the region of the facial part in the image, is a list of coordinate values of a coordinate system set on the image, for example. Person ID 533 is identification information of the person. As person ID 533, for example, a value designated by the user through operation to a display with touch panel or the like is set every time capturing is started.

In step S1200 of FIG. 6, makeup selecting section 250 acquires the facial feature value. The facial feature value is, as described above, multivariate data regarding a predetermined parameter indicating the features of the face. Makeup selecting section 250 acquires the facial feature value from one of image 510 (see FIG. 7), a group of facial feature points of the face (see FIG. 8) and facial part information 530 (see FIG. 9), for example. Makeup selecting section 250 selects a makeup candidate based on the acquired facial feature value. Here, suppose a plurality of makeup candidates are selected.

In step S1300, makeup selecting section 250 determines one display makeup from among a plurality of makeup candidates. Makeup selecting section 250 outputs makeup information corresponding to the determined display makeup to makeup presenting section 260.

In step S1400, makeup presenting section 260 generates a simulation image based on makeup information relating to the determined display makeup and causes display section 270 to display the simulation image.

Figure 10:
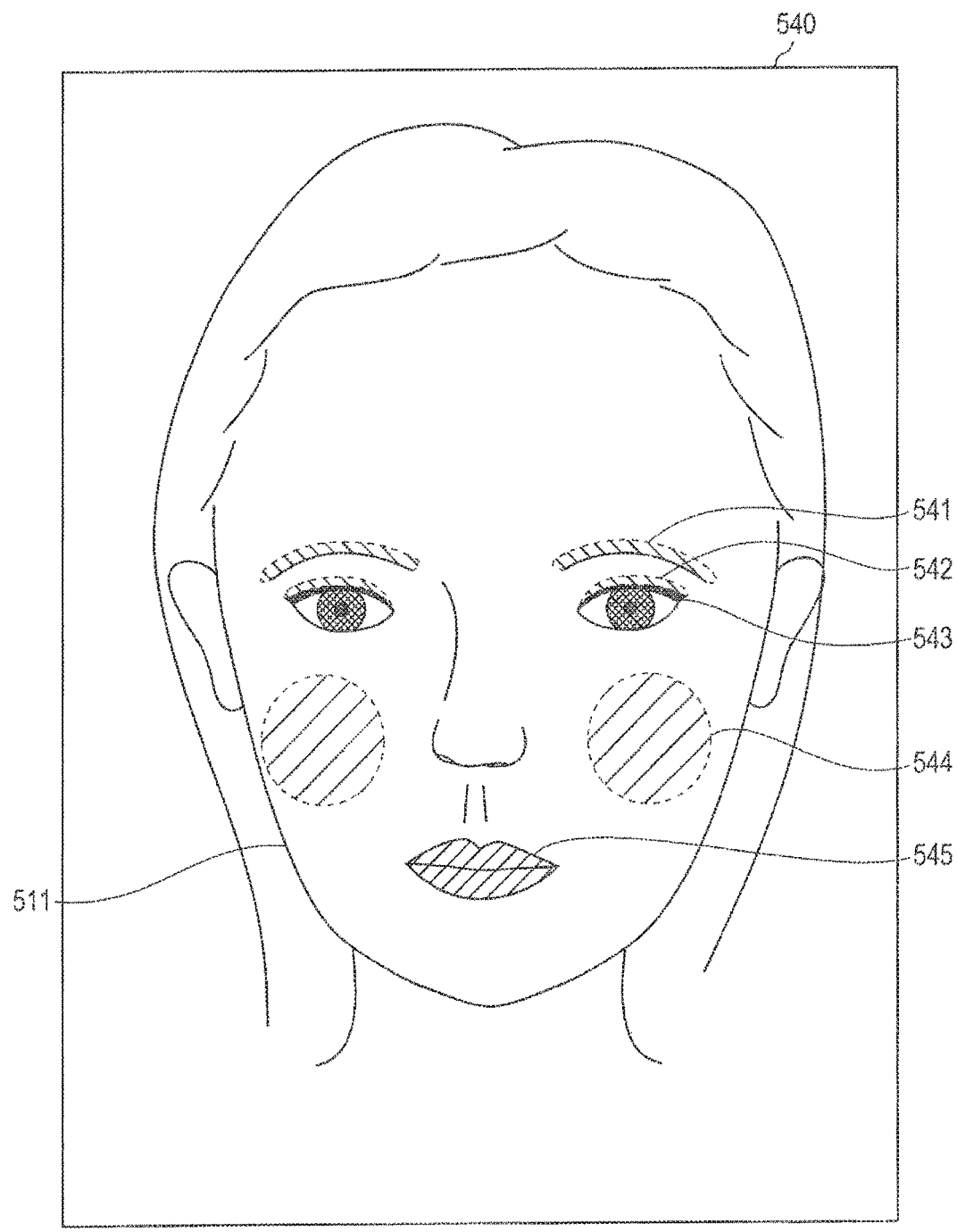
FIG. 10 is a diagram illustrating an exemplary simulation image according to Embodiment 2.

FIG. 10 is a diagram illustrating an exemplary simulation image generated in step S1400 of FIG. 6.

As shown in FIG. 10, simulation image 540 is an image in which makeup images 541 to 545 such as eyebrow, eye shadow, eyeliner, blush, and lipstick are superimposed on face image 511. Suppose simulation image 540 is also an image in which a foundation color is superimposed on face image 511.

In step S1500, makeup selecting section 250 determines whether or not an operation of selecting the current display makeup as the application makeup is performed. When such an operation is not performed (S1500: NO), makeup selecting section 250 moves the process to step S1600.

In step S1600, makeup selecting section 250 determines whether or not an operation of switching the display makeup to another makeup candidate is performed. When such an operation is not performed (S1600: NO), makeup selecting section 250 moves the process to step S1800, which will be described later. When such an operation is performed (S1600: YES), makeup selecting section 250 moves the process to step S1700.

In step S1700, makeup selecting section 250 changes the display makeup to another makeup candidate, outputs the corresponding makeup information to makeup presenting section 260 and proceeds to step S1800.

In step S1800, image acquiring section 220 determines whether or not input of a moving image is continued. When the input of a moving image is continued (S1800: YES), image acquiring section 220 returns the process to step S1400 and moves the process to the next image. When the input of a moving image is finished (S1800: NO), image acquiring section 220 ends a series of processes.

On the other hand, when an operation of selecting one makeup candidate as the application makeup is performed (S1500: YES), makeup selecting section 250 moves the process to step S1900.

In step S1900, makeup presenting section 260 uses printing section 280 to print the application makeup on an outside face of the skin-attachment sheet and then cut the skin-attachment sheet, and ends a series of processes.

Figure 11:
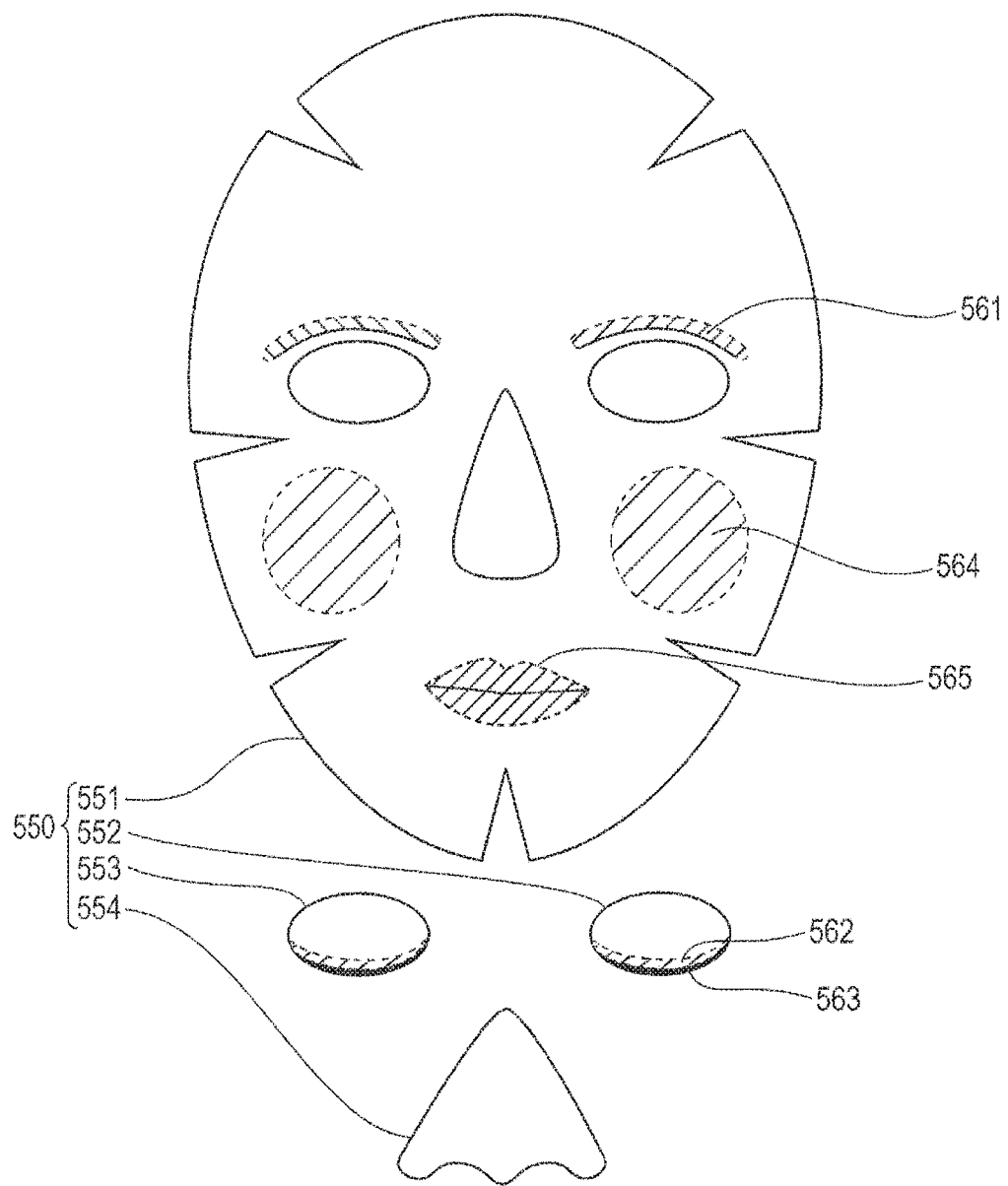
FIG. 11 is a diagram illustrating an exemplary printed skin-attachment sheet according to Embodiment 2.

FIG. 11 is a diagram illustrating an exemplary skin-attachment sheet (hereinafter referred to as "printed skin-attachment sheet") generated in step S1900 of FIG. 6. Here, based on the premise that the skin-attachment sheet is attached with the eyelid being closed, a case will be described as an example where the display makeup of simulation image 540 shown in FIG. 10 is selected as the application makeup.

As shown in FIG. 11, printed skin-attachment sheet 550 is made up of overall face sheet 551, right eyelid part sheet 552, left eyelid part sheet 553 and nose part sheet 554. Right eyelid part sheet 552 and left eyelid part sheet 553 are associated with the left eyelid part when the left eyelid is closed and the right eyelid part when the right eyelid is closed. Overall face sheet 551 includes a plurality of notches on the edge, holes in parts corresponding to both eyes (both eyelids when both eyelids are closed) and a part corresponding to the nose, and a notch in a part corresponding to the mouth. Skin-attachment sheet 550 has moderate elasticity. Although formed two-dimensionally, skin-attachment sheet 550 can be well attached to the skin of the face which has a three-dimensional shape because skin-attachment sheet 550 has such a shape and elasticity. Note that right eyelid part sheet 552 and left eyelid part sheet 553 may not necessarily be separated from overall face sheet 551.

In this case, it is preferable to correspond to the state in which the eyelids are closed and provide notches in parts corresponding to the eyes.

Images 561 to 565 are printed on overall face sheet 551, right eyelid part sheet 552, and left eyelid part sheet 553 in correspondence to makeup images 541 to 545 of simulation image 540. Suppose colors corresponding to the foundation colors displayed in simulation image 540 are printed on all sheets 551 to 554.

The user first peels off only the edge of such printed skin-attachment sheet 550 from the mount and attaches the peeled part to the corresponding parts of the skin of the face. While holding the part attached to the skin, the user pulls the mount in parallel with the skin and in a direction toward the part where attachment has not been completed. This allows the user to well attach to the skin, skin-attachment sheet 550 on which makeup images 541 to 545 are printed By leaving skin-attachment sheet 550 attached, it is possible to easily reproduce the selected makeup.

Note that notches are preferably formed along the eyelid lines and the mouth line. Openings are preferably provided in the regions corresponding to the nose holes.

Through the above-described operation, makeup assisting apparatus 100 can present to the user, makeup suitable for the user sequentially, following the moving image of the face and in association with the corresponding regions. Therefore, the user can check the makeup effects while changing the orientation of the face and facial expressions, and can experience as if the user were looking at the user's face actually subjected to makeup and reflected on a mirror.

Makeup assisting apparatus 100 can receive an operation of switching of display makeup from the user at arbitrary timing. This allows the user to appropriately and speedily determine makeup that matches the user's preference from among a plurality of makeup candidates and select it as a target for printing on the outside face of the skin-attachment sheet.

<Skin-Attachment Sheet>

Next, details of the aforementioned skin-attachment sheet with a mount will be described.

Skin-attachment sheets with a mount are produced by a manufacturing machine in a factory or the like and distributed and sold to users.

Figure 12:
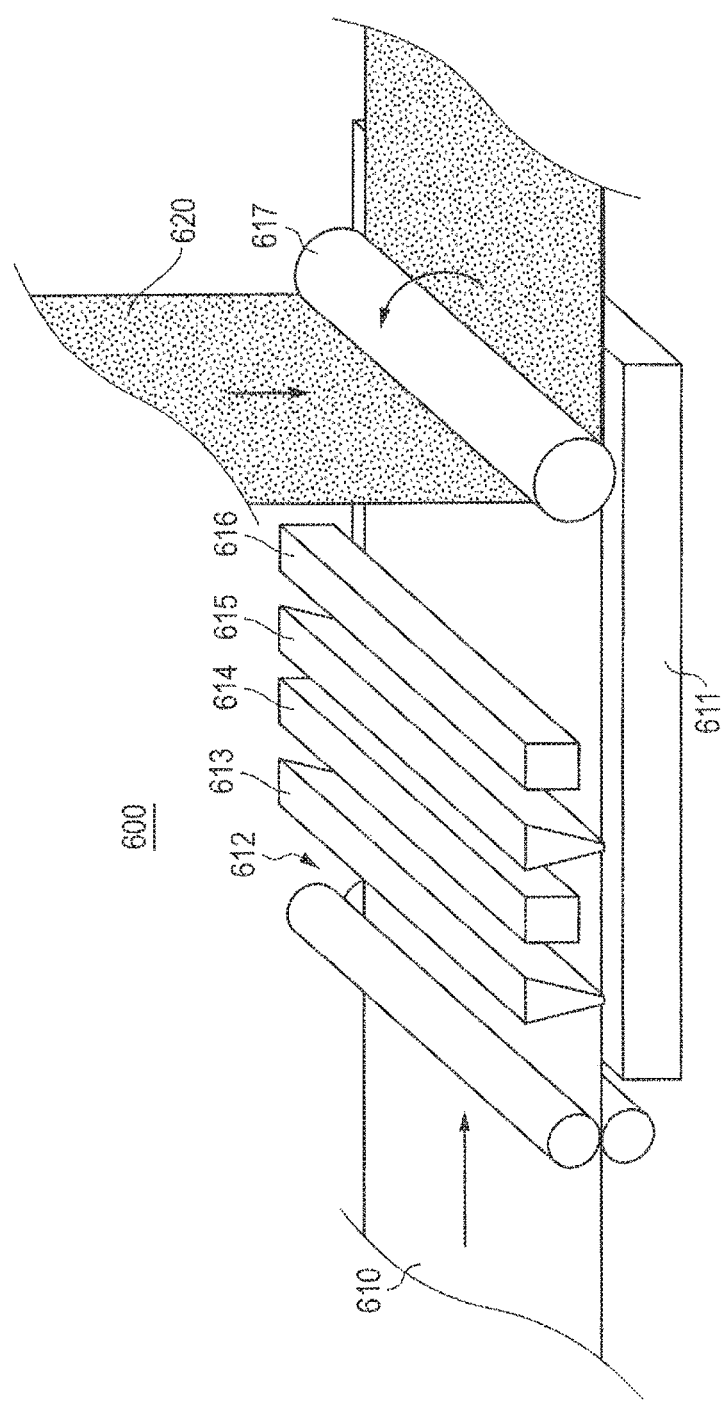
FIG. 12 is a perspective view illustrating an exemplary schematic configuration of a manufacturing machine of a thin-film sheet with a mount according to Embodiment 2.

FIG. 12 is a perspective view illustrating an exemplary schematic configuration of a manufacturing machine of a skin-attachment sheet with a mount.

As shown in FIG. 12, in manufacturing machine 600 of a thin-film sheet with a mount, roll feeding section 612, first-layer application head section 613, first-layer drying head section 614, second-layer application head section 615, second-layer drying head section 616, and mount pressing roll section 617 are arranged in that order on base part 611 on which sheet protection paper 610 is placed.

Sheet protection paper 610 is made of, for example, a silicone raw material which can be easily peeled off from a hardened first layer, which will be described later. Roll feeding section 612 causes sheet protection paper 610 to pass through first-layer application head section 613 to mount pressing roll section 617 in that order.

First-layer application head section 613 uniformly applies a liquid-phase substance made of biocompatible polymer such as polylactic acid to the top surface of sheet protection paper 610 as a first layer.

First-layer drying head section 614 includes, for example, an iron-chromium wire heater, and places the first-layer applied to the top surface of sheet protection paper 610 in an environment of approximately 70 to 110° C. for approximately 90 seconds to dry the first-layer and cause the first layer to harden to moderate hardness.

Second-layer application head section 615 uniformly applies, on the hardened first layer, a liquid-phase substance having a function as a basic cosmetic material containing a moisturizing component such as hyaluronic acid and a function of causing the raw material of a dried second layer, which will be described later, to come into close contact with the skin as a second layer.

Second-layer drying head section 616 includes, for example, an iron-chromium wire heater, places the second layer applied on the top surface of the first layer in an environment of approximately 100 to 110° C. for approximately 90 seconds to dry the second layer and cause the second layer to harden to moderate hardness. The hardened second layer, which is left closely attached to the skin, implements skin care using the basic cosmetic material.

Note that the total thickness of the hardened first layer and second layer is preferably approximately 10 nm to 500 nm.

Mount pressing roll section 617 supplies mount 620 to the top surface of the hardened second layer and crimps mount 620 onto the top surface of the second layer. Mount 620 is made of, for example, a silicone raw material which can be easily peeled off from the hardened second layer.

Using such manufacturing machine 600, a skin-attachment sheet with a mount is generated in which sheet protection paper 610, the skin-attachment sheet made up of the first layer and the second layer, and mount 620 are attached to one another in that order. Note that a cutter for cutting the skin-attachment sheet with a mount to a predetermined length may be provided after manufacturing machine 600.

The skin-attachment sheet with a mount generated in this way is stripped of sheet protection paper 610, for example, by the user's hand, supplied to base part 281 of printing section 280 (see FIG. 5) and subjected to printing of the selected makeup and cutting according to the face.

Effects of Present Embodiment

As described above, makeup assisting apparatus 100 according to the present embodiment causes pigment corresponding to makeup selected for each face to be held on the outside face of the skin-attachment sheet. This allows the user to attach the sheet on which the selected makeup is applied to the skin of the face, leave the sheet attached, and thereby easily reproduce such makeup. Therefore, makeup assisting apparatus 100 can appropriately assist a user who does not have enough makeup skill to perform makeup.

Makeup assisting apparatus 100 according to the present embodiment causes pigment to be held on the skin-attachment sheet through inkjet multi-color printing. This allows makeup assisting apparatus 100 to reproduce a fine pattern, complicated color, and delicate tone of the makeup selected by makeup selecting section 250 with high accuracy.

Makeup assisting apparatus 100 according to the present embodiment prints an image corresponding to the makeup on the outside face of the skin-attachment sheet. Since makeup assisting apparatus 100 does not always require high biocompatibility for the ink used for printing in this way, it is possible to improve the degree of freedom of apparatus design and the degree of freedom of makeup selection. Furthermore, makeup assisting apparatus 100 can reduce the possibility of smeared makeup caused by sweat and sebum, and implement makeup which remains stable for a long time.

Makeup assisting apparatus 100 according to the present embodiment uses a skin-attachment sheet in which a basic cosmetic material is applied to the inside face. This allows makeup assisting apparatus 100 to reduce the possibility of smeared makeup of the basic cosmetic material caused by sweat and sebum, and maintain the initial distribution state for a long time. Maintaining such a distribution state is suitable for a basic cosmetic material that prevents ultraviolet rays from reaching the skin, having a so-called UV (ultraviolet ray) cutting function.

Makeup assisting apparatus 100 according to the present embodiment prints makeup corresponding to a plurality of facial parts on one skin-attachment sheet (or one set of skin-attachment sheets made up of a plurality of sheets). This prevents the makeup from becoming imperfect such as partially missing makeup.

<Other Techniques of Selecting Makeup Candidate>

Note that the makeup candidate selection technique is not limited to the above-described example. For example, makeup selecting section 250 may select fashionable makeup preferentially irrespective of a facial feature value or select a makeup candidate based on a facial feature value and other information.

Makeup is selected based on, for example, a skin condition. The skin condition is, for example, smear, wrinkle, sebum secretion, hidden smear, water content, blood flow and perspiration or the like of the skin of the face, and acquired, for example, through analysis of an image captured using daily light, ultraviolet rays, infrared light or laser light.

More specifically, makeup selecting section 250 selects makeup that applies a concealer to the smeared part and dark circles under the eyes, for example.

Makeup may also be selected based on a predicted change in the skin condition. A change in the skin condition is predicted from the above-described skin condition, environment information, and physical condition information. The environment information includes weather, air temperature, season and an amount of solar radiation, for example. The physical condition information includes a sleeping time, body temperature, amount of physical activities, eyelid opening, eye blink frequency, time in menstruation cycle and blood pressure, for example.

More specifically, when the user lacks sleep, for example, makeup selecting section 250 selects makeup that applies a concealer under the eyes assuming that dark circles under the eyes may become darker after a lapse of a certain time.

Makeup may also be selected based on the user's attribute information such as age or residential region.

Various kinds of information used to select makeup may be inputted through the user's operation or may be acquired through communication by makeup assisting apparatus 100 from a server on the Internet, or various electric appliances or sensor devices or the like used by the user.

Furthermore, for example, makeup selecting section 250 may perform color correction of makeup.

The impression of a color of the face varies depending on colors of surroundings or a scene. For example, the face color of a person wearing red-based clothes looks like a color slightly more similar to a turquoise color than the original color. Moreover, the same makeup may be perceived as a fancy tone or quiet tone depending on the scene.

Thus, makeup selecting section 250 acquires a color of clothes, a color of the skin and a color of the hair or the like of the user from the image, selects makeup of an appropriate tone as a makeup candidate based on the acquired color or corrects the selected tone of the makeup candidate to an appropriate tone. Thus, makeup assisting apparatus 100 can select more appropriate makeup and present it to the user. The user can apply makeup of appropriate tone without judging whether the tone is good or bad by oneself. Such a selection of makeup exhibits a high effect in selecting a foundation color in particular.

<Selection of Basic Cosmetic Material per Face>

Makeup assisting apparatus 100 may also be configured to select skin care implemented using the skin-attachment sheet for each face.

In this case, for example, the skin-attachment sheet does not always require the above-described first layer and the skin-attachment sheet is supplied to printing section 280, with the inside face thereof attached to a mesh-like mount. Makeup selecting section 250 further selects skin care for each face in addition to makeup. Printing section 280 further has a function of blowing a basic cosmetic material over the surface of the skin-attachment sheet with a mount on the mount side (that is, inside face of the skin-attachment sheet). Makeup presenting section 260 causes printing section 280 to blow the basic cosmetic material corresponding to the selected skin care over the mount.

Since the mount is a mesh-like one, the blown basic cosmetic material passes through the mount, reaching the inside face of the skin-attachment sheet. When the mount is peeled off in this condition, the basic cosmetic material corresponding to the selected skin care is held on the inside face of the skin-attachment sheet.

Skin care is selected based on the skin condition, for example.

More specifically, makeup selecting section 250 selects skin care that applies a basic cosmetic material having a high light scattering effect to smeared parts and selects skin care that applies a basic cosmetic material having a high skin-whitening effect to hidden smeared parts, for example. Makeup selecting section 250 selects skin care that applies a basic cosmetic material having high astringent action and sebum adsorption action to parts estimated to have a high degree of aging based on the ellipticity of skin pores.

Skin care is also selected based on, for example, a change in a predicted skin condition.

More specifically, for example, when the user's body temperature is high, makeup selecting section 250 selects skin care that applies a moisture-retaining beauty lotion by assuming that the drying of the skin will advance.

Various kinds of information used to select skin care may be inputted through the user's operation or may be acquired through communication by makeup assisting apparatus 100 from a server on the Internet, various electric appliances or sensor devices or the like used by the user.

<Other Examples of Skin-Attachment Sheet>

When a skin-attachment sheet is supplied which is cut in advance into a shape based on a general arrangement of facial parts, printing section 280 need not have any cutting function and makeup presenting section 260 need not output sheet shape information. However, makeup presenting section 260 needs to output information indicating a positional relationship between the shape of the skin-attachment sheet and makeup to printing section 280.

When foundation in particular is not selected as the application makeup, the skin-attachment sheet may be generated by being separated for each facial part such as eye shadows placed on the eyelids, blushes placed on the cheeks and lipstick placed on the lip.

Note that the skin-attachment sheet preferably has a raw material and a thickness that allow the skin color to sufficiently pass therethrough in consideration of a case where foundation is not selected.

<Displaying of Guide Information>

When the skin-attachment sheet has a predetermined shape relative to the region of a facial part, makeup presenting section 260 may sequentially generate a guide image for each image that makes up a moving image and display the guide images on display section 270. Here, the guide image is an image obtained by superimposing guide information indicating a position of the face at which the skin-attachment sheet is to be closely attached on an image acquired by image acquiring section 220. The predetermined shape relative to the region of a facial part is a shape determined by makeup presenting section 260 for each face or a shape based on the above-described general arrangement of facial parts.

<Variations with Other Configurations>

In addition, the above-described various types of tables may not be stored in makeup assisting apparatus 100. For example, if makeup assisting apparatus 100 can be connected to a network, makeup assisting apparatus 100 can access a server on the network in which the above-described tables are stored and can select makeup.

Further, makeup assisting apparatus 100 may be a distributed arrangement system, for example, a system in which, among functional sections illustrated in FIG. 2, only capturing section 210 and display section 270 are disposed at a terminal of the user and the other sections of the apparatus are disposed on a server on the network, or the like.

Further, makeup selecting section 250 may detect outside light and acquire the facial feature value in a state where the influence of external light is reduced from the image.

Further, the specific contents of makeup are not limited to the above-described examples. For example, makeup to be presented includes the way of applying lip gloss, and the like to be presented.

Makeup supporting apparatus 100 may present the skin care to the user using a technique different from that of the skin-attachment sheet. For example, makeup supporting apparatus 100 may cause display section 270 to display information on the skin care. The skin care in this case may include various skin care measures other than basic cosmetic materials such as the way of applying face massage, the way of applying dietary habits.

A makeup assisting apparatus of the present disclosure includes: a makeup selecting section that selects makeup for each face, the makeup being a way of applying makeup, the face being subjected to the makeup; and a makeup presenting section that causes pigment corresponding to the selected makeup to be held on a surface on a side of a sheet closely attachable to a skin of the face for a long time, the side being opposite to a side of the sheet where the sheet is closely attached to the skin.

Preferably, the makeup assisting apparatus further includes a printing section that performs printing on the surface of the sheet, in which the makeup presenting section causes the printing section to print an image corresponding to the selected makeup.

Preferably, the makeup assisting apparatus further includes: an image acquiring section that acquires a captured image of the face; a facial part acquiring section that acquires a region of a facial part of the face from the image; and a display section that displays an image, in which the makeup selecting section selects, for each facial part, a makeup candidate which is a candidate for makeup that is subjected to the printing, the makeup presenting section causes the display section to display a simulation image obtained by superimposing on the image, an image indicating a state of the makeup candidate when the makeup candidate is applied to the face, and the makeup selecting section receives a selection operation on the displayed makeup candidate and selects the selected makeup candidate as application makeup which is makeup subjected to the printing.

Preferably, in the makeup assisting apparatus, the makeup presenting section causes, when the application makeup is selected for a plurality of the facial parts, the printing section to print an image corresponding to the application makeup with an arrangement corresponding to an arrangement of a plurality of regions acquired for the plurality of facial parts.

Preferably, the makeup assisting apparatus further includes an image capturing section that captures a moving image of the face, in which the sheet has a predetermined shape relative to the region of the facial part, the image acquiring section acquires an image that makes up the moving image, and the makeup presenting section sequentially generates guide images obtainable by superimposing on the image, guide information indicating a position on the face at which the sheet is to be closely attached for each image making up the moving image, and causes the display section to display the guide images.

Preferably, in the makeup assisting apparatus, the makeup selecting section further selects, for each face, skin care which is a way of applying a basic cosmetic, and the makeup presenting section causes a basic cosmetic material corresponding to the selected skin care to be held on the surface on the side of the sheet where the sheet is to be closely attached to the skin.

Preferably, in the makeup assisting apparatus, the makeup selecting section further selects, for each face, skin care which is a way of applying a basic cosmetic, the printing section further includes a function of blowing a basic cosmetic material over the surface on the side of the sheet where the sheet is to be closely attached to the skin, the makeup presenting section causes the printing section to blow the basic cosmetic material corresponding to the selected skin care over the sheet, and the printing section is supplied with the sheet while the surface on the side of the sheet where the sheet is to be closely attached to the skin is attached to a mesh-like mount.

Preferably, in the makeup assisting apparatus, the sheet is made of a biocompatible polymer.

Preferably, in the makeup assisting apparatus, the printing section includes a cutter section that cuts the sheet, and the makeup presenting section calculates a shape of the sheet that is three-dimensionally attachable to the face, and causes the cutter section to cut the sheet into the calculated shape.

Preferably, in the makeup assisting apparatus, the shape of the sheet is such a shape that the shape is for a state in which an eyelid of the face is closed, that notches are formed at parts of the shape corresponding to an eye and a mouth of the face, and that at least a part of the shape corresponding to a nose part of the face is separated.

Preferably, in the makeup assisting apparatus, the makeup selecting section selects makeup based on a change in a skin condition of the face.

Preferably, in the makeup assisting apparatus, the makeup selecting section selects the makeup and/or corrects a color of the selected makeup based on at least one of a color of clothes, a color of the skin and a color of the hair of a subject whose face is subjected to the makeup.

Preferably, in the makeup assisting apparatus, the makeup selecting section selects the skin care based on a change in a skin condition of the face.

A skin-attachment sheet serving as the sheet used for the makeup assisting apparatus of the present disclosure includes: a protection layer that is provided on a surface on a side of the skin-attachment sheet that is opposite to a side of the skin-attachment sheet where the sheet is to be closely attached to the skin, and that is capable of being peeled off from the surface; and a mount that is provided on the surface on the side of the skin-attachment sheet where the sheet is to be closely attached to the skin, and that is capable of being peeled off from the surface, in which the skin-attachment sheet is supplied to the printing section after the protection layer is peeled off.

Preferably, the skin-attachment sheet in which a basic cosmetic material having an ultraviolet-ray cutting function is held on the surface on the side of the skin-attachment sheet where the sheet is to be closely attached to the skin.

A makeup assisting method of the present disclosure includes: selecting makeup for each face, the makeup being a way of applying makeup, the face being subjected to the makeup; and causing pigment corresponding to the selected makeup to be held on a surface on a side of a sheet closely attachable to a skin of the face for a long time, the side being opposite to a side of the sheet where the sheet is to be closely attached to the skin.

A makeup assisting program of the present disclosure that causes a computer to execute processing including: selecting makeup for each face, the makeup being a way of applying makeup, the face being subjected to the makeup; and causing pigment corresponding to the selected makeup to be held on a surface on a side of a sheet closely attachable to a skin of the face for a long time, the side being opposite to a side of the sheet where the sheet is to be closely attachable to the skin.

It is to be noted that the program may be recorded in a computer-readable recording medium. The recording medium may be a non-transitory recording medium such as a flash memory.

The disclosure of Japanese Patent Application No. 2013-059801, filled on Mar. 22, 2013, including the specification, drawings and abstract is incorporated herein by reference in its entirety.

INDUSTRIAL APPLICABILITY

The present invention is useful as a makeup assisting apparatus, a makeup assisting method and a makeup assisting program which can appropriately assist makeup for users who do not have enough makeup skill.

REFERENCE SIGNS LIST

100 Makeup assisting apparatus
210 Image capturing section
220 Image acquiring section
230 Facial part acquiring section
240 Makeup table storing section
250 Makeup selecting section
260 Makeup presenting section
270 Display section
280 Printing section
281, 611 Base part
282 Printing head section
283 Roll feeding section
284 Laser cutter section
285 Sheet hook section
600 Manufacturing machine
612 Roll feeding section
613 First-layer application head section
614 First-layer drying head section
615 Second-layer application head section
616 Second-layer drying head section
617 Mount pressing roll section

What is claimed is:

1. A skin-attachment sheet for makeup comprising:
a thin-film layer made of polylactic acid, polyglycolic acid, polycaprolactone, or a copolymer thereof, and a biocompatible polymer, the thickness of a first layer thereof being from 10 nm to 500 nm, and an ink corresponding to a makeup image is printed on a surface of the thin-film layer on an opposite side of a surface of the thin-film layer attachable to the skin,
a mount that is provided on a surface on the thin-film layer, and that is capable of being peeled off from the surface on which the mount is provided.

2. The skin-attachment sheet according to claim 1, wherein the makeup image is printed by inkjet multi-color printing.

3. The skin-attachment sheet according to claim 1, wherein a basic cosmetic material including a moisturizing component comprising hyaluronic acid is applied on a side of the surface of the thin-film layer attachable to the skin.

4. The skin-attachment sheet according to claim 1, wherein the mount is made of silicone raw material.

5. The skin-attachment sheet according to claim 1, wherein the thin-film includes an ultraviolet-ray cutting component that is applied on a side of the surface of the thin-film layer attachable to the skin.

6. The skin-attachment sheet according to claim 1, wherein the biocompatible polymer is one of hyaluronic acid, and chitosan.

7. The skin-attachment sheet according to claim 1, wherein the printing image is a concealer concealing a smeared part and dark circles under the eyes.

8. A makeup assisting method comprising:
acquiring a captured image of a face of a person to which a makeup is applied;
storing in a memory a makeup table which associates an acquired facial feature value with makeup appropriate for the face having the acquired facial feature value;
selecting one of makeup appropriate for the face from the memory based on a skin condition which is acquired from analysis of the captured image; and
printing with a printer a makeup image corresponding to the selected makeup to an opposite side of a skin-attachment sheet attachable to a skin of the face, the skin-attachment sheet having a predetermined shape relative to a region of a part of the face to which the skin-attachment sheet is to be attached, wherein
the skin-attachment sheet includes a thin-film layer made of polylactic acid, polyglycolic acid, polycaprolactone, or a copolymer thereof, and a biocompatible polymer, the thickness of a first layer thereof is from 10 nm to 500 nm, and an ink corresponding to the makeup image is printed on the opposite side of the skin-attachment sheet attachable to a skin of the face, and a mount that is provided on a surface on the thin-film layer, and that is capable of being peeled off from the surface on the thin-film layer on which the mount is provided.

9. The makeup assisting method according to claim 8, wherein the biocompatible polymer is one of hyaluronic acid, and chitosan.

10. The makeup assisting method according to claim 8, wherein the makeup image is printed by inkjet multi-color printing.

11. The makeup assisting method according to claim 8, wherein a basic cosmetic material including a moisturizing component comprising hyaluronic acid is applied on a side of the surface of the thin-film layer attachable to the skin.

12. The makeup assisting method according to claim 8, wherein the thin-film includes an ultraviolet-ray cutting component applied on a side of the surface of the thin-film layer attachable to the skin.

13. The makeup assisting method according to claim 8, wherein the printing image is a concealer concealing a smeared part and dark circles under the eyes.

* * * * *